United States Patent
Cheng (10) Patent No.: US 11,113,801 B1
(45) Date of Patent: Sep. 7, 2021

(54) ROBUST IMAGE MOTION DETECTION USING SCENE ANALYSIS AND IMAGE FRAME PAIRS

(71) Applicant: Apple Inc., Cupertino, CA (US)

(72) Inventor: Wu Cheng, Millbrae, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 16/563,327

(22) Filed: Sep. 6, 2019

Related U.S. Application Data (60) Provisional application No. 62/729,850, filed on Sep. 11, 2018.

(51) Int. Cl.
*G06T 5/00* (2006.01)
*G06T 5/50* (2006.01)
*G06T 7/246* (2017.01)
*G06T 7/269* (2017.01)

(52) U.S. Cl.
CPC ............... *G06T 5/50* (2013.01); *G06T 5/001* (2013.01); *G06T 7/248* (2017.01); *G06T 7/269* (2017.01); *G06T 2207/10016* (2013.01); *G06T 2207/10144* (2013.01); *G06T 2207/20221* (2013.01)

(58) Field of Classification Search
CPC .......... G06T 5/50; G06T 5/001; G06T 7/269; G06T 7/248; G06T 2207/10016; G06T 2207/20221; G06T 2207/10144
See application file for complete search history.

(56) References Cited

U.S. PATENT DOCUMENTS

| | | | |
|---|---|---|---|
| 8,203,615 B2 | 6/2012 | Wang | |
| 9,547,902 B2 | 1/2017 | Ionasec | |
| 9,843,730 B2* | 12/2017 | Molgaard | G06T 5/003 |
| 10,298,864 B2* | 5/2019 | Li | G06T 5/50 |
| 2005/0013501 A1* | 1/2005 | Kang | G06T 7/269 382/254 |
| 2013/0044127 A1* | 2/2013 | Wu | G06T 5/009 345/629 |
| 2014/0307960 A1 | 10/2014 | Sharma | |
| 2019/0014249 A1* | 1/2019 | Zhu | H04N 5/2258 |

* cited by examiner

*Primary Examiner* — Chan S Park
*Assistant Examiner* — Claude Noel Y Zanetsie
(74) *Attorney, Agent, or Firm* — Blank Rome LLP (57) ABSTRACT

Devices, methods, and computer-readable media describing an adaptive approach to reference image selection are disclosed herein, e.g., to generate fused images with reduced motion distortion. More particularly, an incoming image stream may be obtained from an image capture device, which image stream may comprise a variety of different image captures, e.g., including "image frame pairs" (IFPs) that are captured consecutively, wherein the images in a given IFP are captured with differing exposure settings. When a capture request is received at the image capture device, the image capture device may select two or more images from the incoming image stream for fusion, e.g., including at least one IFP. In some embodiments, one of the images from the at least one IFP will be designated as the reference image for a fusion operation, e.g., based on a robust motion detection analysis process performed on the images of the at least one IFP.

20 Claims, 4 Drawing Sheets

ROBUST IMAGE MOTION DETECTION USING SCENE ANALYSIS AND IMAGE FRAME PAIRS

TECHNICAL FIELD

This disclosure relates generally to the field of digital image processing. More particularly, but not by way of limitation, it relates to techniques for robust image motion detection and image fusion with reduced motion distortion.

BACKGROUND

Fusing multiple images of the same captured scene is an effective way of increasing signal-to-noise ratio (SNR) in the resulting fused image. This is particularly important for small and/or thin form factor devices—such as mobile phones, tablets, laptops, wearables, etc.—for which the pixel size of the device's image sensor(s) is often quite small. The smaller pixel size means that there is comparatively less light captured per pixel (i.e., as compared to a full-sized, standalone camera having larger pixel sizes), resulting in more visible noise in captured images—especially in low-light situations.

In image fusion, one of the images to be fused may be designated as the "reference image." The other images that are to be part of the fusion operation may be designated as "candidate images," and the candidate images are registered to the reference image before the fusion operation. The decision of which image in a set of captured images should serve as the reference image may be based on, e.g., an image quality measure (such as sharpness, acutance, face quality, noise level, etc.), a capture timing measure (such as the image captured closest in time to a received capture request, e.g., if images are being obtained in a streaming fashion), a device condition measurement (such as an image captured with the least amount of device rotation), or any other image condition or set of conditions desired by a given implementation.

Often, there can be significant capture time differences between the images that are to be fused, and, therefore, the image registration process may not be able to account for local motion within the images, camera shake, and/or rotation between captured images, etc. In these situations, the differences between corresponding pixels in the reference and candidate images may not just be noise—they may instead be differences caused by a failure of the image registration algorithm. For example, a region(s) of the reference image that changes over time across the captured images, e.g., due to object motion or registration errors, may create "ghosting artifacts" in the final fused image. The appearance and characteristics of ghosting artifacts may vary from image to image. For example, a section of the image that has a certain color in the reference image, but has different colors in the other candidate images will, when combined with the candidate images, result in a faded look or a false color region that is potentially noticeable by a viewer of the final fused image. On the other hand, an edge area or a textured area that moves over time across the captured images may, when fused, have visible multi-edges (e.g., double edges, triple edges, etc.), which may also be noticeable in the final fused image.

Despite these potential difficulties, in general, by fusing multiple images together, a better quality resultant image may be achieved than may be obtained from a single image capture. Thus, what is needed is an approach to adaptively select a preferable reference image, e.g., from bracketed captures of arbitrary exposures, such that the fused result is of improved quality, e.g., from a motion distortion reduction standpoint.

SUMMARY

Various devices, methods, and non-transitory program storage devices are disclosed herein that take an adaptive approach to reference image selection, e.g., from an incoming image stream, in order to generate fused images with reduced motion distortion. More particularly, an incoming image stream may be obtained from one or more image capture devices, wherein the incoming image stream may comprise a variety of different bracketed image captures, which are, e.g., received in a particular sequence and/or according to a particular pattern. In some cases, the incoming image steam may comprise "image frame pairs" (or larger sets of images, e.g., 3, 4, or 5 images, etc.), which are captured in a consecutive fashion, e.g., with minimal time delay between the capture of the images in the image frame pair, and wherein the images in a given image frame pair comprise images captured with differing exposure settings.

When a capture request is received, e.g., from a user of the image capture device, the device may then select, based on an evaluation of one or more capture conditions, two or more images from the incoming image stream for fusion. In some embodiments, the two or more selected images may include at least one image frame pair. In some instances, one image from the selected two or more images may be designated to serve as the reference image for the fusion operation, and the other images from the selected two or more images may be designated to serve as candidate images.

According to some embodiments disclosed herein, the decision of which image from the selected two or more images to use as the reference image may be based on a robust motion detection analysis process. In some instances, the reference image may be selected to come from one of a plurality of candidate image frame pairs. Once the candidate image frame pair from which the reference image will come has been selected, the robust motion detection analysis process may aid in the determination of which of the images in the selected candidate image frame pair will serve as the reference image for the fusion operation.

For example, at least one of the images in the selected candidate image frame pair may comprise an "underexposed" image, e.g., an EV− image (as will be described in further detail below), and another at least one of the images in the selected candidate image frame pair may comprise a normally-exposed image, e.g., an EV0 image—or even an "overexposed" image, e.g., an EV+ image (as will be described in further detail below). If less than a threshold amount of motion is detected in the scene captured by the images in the selected candidate image frame pair, it may be beneficial to utilize the normally-exposed, e.g., EV0, image from the selected candidate image frame pair as the reference image for the fusion operation, due to the lower predicted noise levels in a normally-exposed image as compared to an underexposed, e.g., EV−, image. On the other hand, if greater than a threshold amount of motion is detected in the scene captured by the images in the selected candidate image frame pair, it may be beneficial to utilize the underexposed, e.g., EV−, image from the selected candidate image frame pair as the reference image for the fusion operation, due to the better motion freezing capabilities provided by an underexposed, shorter exposure time image, i.e., as compared to a normally-exposed, e.g., EV0, image.

The other image(s) from the selected candidate image frame pair, i.e., the image(s) that are not designated to serve as the reference image, may instead serve as candidate images in the fusion operation.

Once the reference image has been identified, the one or more designated candidate images may be registered with the reference image, e.g., via global and/or local image registration processes. Then, for each pixel in the reference image, a corresponding pixel will be located in each of the one or more candidate images, and each reference pixel will be fused together with the corresponding candidate image pixels that have been deemed similar enough to the reference pixel to contribute to the fusion operation.

In some embodiments, e.g., in order to achieve increased performance efficiency, the robust motion detection analysis process that is used to aid in the decision of which image from the selected two or more images to use as the reference image may further comprise analyzing a Region of Interest (ROI) within one or more of the selected images, wherein the ROI may comprise one or more portions covering less than the entire extent of the image. The location and/or size of the ROI portions within the captured images may be determined based on one or more of the following factors: a predetermined portion of the captured image (e.g., a central portion); an orientation of the image capture device during capture; a portion of the capture image to which the image capture device's Auto Focus (AF) and/or Auto Exposure (AE) mechanisms have been directed; an explicit selection from a user; and/or high-level content analysis (e.g., output from face detection, neural networks, scene classification, object recognition, scene segmentation, and/or saliency networks, etc.).

In still other embodiments, in an effort to achieve further increases in performance efficiency, masks may be generated over the two or more selected images, which, e.g., exclude or reduce the influence of regions of pixels within the various selected images that may introduce interfering factors to the motion detection analysis process, e.g., regions of clipped (or near-clipped) pixels.

In yet other embodiments, the motion detection analysis process may comprise computing a gradient map, e.g., with edge detection kernels, for the images within a candidate image frame pair that are being considered to serve as the reference image for the fusion operation and determining whether the amount of "missing information" in one of the images being considered (which missing information may be largely correlated to the presence of motion within the image) exceeds a threshold motion amount.

As mentioned above, various non-transitory program storage device embodiments are disclosed herein. Such program storage devices are readable by one or more processors. Instructions may be stored on the program storage devices for causing the one or more processors to: obtain an incoming image stream from one or more image capture devices; select two or more images from the incoming image stream, wherein the selected two or more images comprise at least one image frame pair (IFP), wherein the IFP comprises a first image frame and a second image frame that were captured consecutively and with differing exposure settings; determine one of the first image frame or the second image frame to be designated as a reference image, wherein the determination is based, at least in part, on a comparison of an amount of motion in the first image frame to an amount of motion in the second image frame; determine one or more of the selected two or more images not designated as a reference image to be designated as candidate images; register the one or more candidate images with the reference image; fuse the registered one or more candidate images and the reference image, resulting in a fused image; and store the fused image in the memory.

Various methods of taking an adaptive approach to reference image selection in order to generate fused images with reduced motion distortions are also disclosed herein, in accordance with the various embodiments enumerated above. Various programmable electronic devices are also disclosed herein, in accordance with the various embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various program storage device embodiments enumerated above.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

An Incoming Image Stream of Images with Differing Exposure Characteristics

Discussion will now turn to various examples of the types of images that may be obtained as part of an incoming image stream, as well as the nomenclature that will be used herein to refer to various differently-exposed images that may be obtained from the incoming image stream. As in conventional bracket notation, "EV," as used herein, stands for exposure value and refers to a given exposure level for an image (which may be controlled by one or more settings of a device, such as an image capture device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV), given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV−" image refers to an underexposed image that is captured at a lower stop (e.g., 0.5, 1, 2, or 3 stops) than would be used to capture an EV0 image. For example, an "EV−1" image refers to an underexposed image that is captured at one stop below the exposure of the EV0 image, and "EV−2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

For example, according to some embodiments, the incoming image stream may comprise a combination of: EV−, EV0, EV+, and/or other short or long exposure images. It is further noted that the image stream may also comprise a combination of arbitrary exposures, as desired by a given implementation or operating condition, e.g., EV+2, EV+4, EV−3 images, etc.

According to some embodiments, long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated on-the-fly at capture time (e.g., within a predetermine range). A long exposure image may come from a single image captured from a single camera, or, in other instances, a long exposure image may be "synthesized" from multiple captured images that are fused together (which will be referred to herein as a "synthetic long exposure image"). In instances where the image capture device is capable of performing Optical Image Stabilization (OIS), the OIS may be actively stabilizing the camera and/or image sensor during capture of the long exposure image and/or one or more of the other captured images. (In other embodiments, there may be no OIS stabilization employed during the capture of the other, i.e., non-long exposure images, or a different stabilization control technique may be employed for such non-long exposure images). In some instances, an image capture device may only use one type of long exposure image. In other instances, the image capture device may capture different types of long exposure images, e.g., depending on capture conditions. For example, in some embodiments, a synthetic long exposure image may be created when the image capture device does not or cannot perform OIS, while a single long exposure image may be captured when an OIS system is available and engaged at the image capture device. According to some embodiments, in order to recover a desired amount of shadow detail in the captured image, some degree of overexposure (e.g., EV+2) may intentionally be employed in bright scenes and scenes with medium brightness. Thus, in certain brighter ambient light level conditions, the long exposure image itself may also comprise an image that is overexposed one or more stops with respect to EV0 (e.g., EV+3, EV+2, EV+1, etc.). To keep brightness levels consistent across long exposure images, the gain may be decreased proportionally as the exposure time of the capture is increased, as, according to some embodiments, brightness may be defined as the product of gain and exposure time.

In some embodiments, long exposure images may comprise images captured with greater than a minimum threshold exposure time, e.g., 50 milliseconds (ms) and less than a maximum threshold exposure time, e.g., 250 ms. In other embodiments, long exposure images may comprise images captured with a comparatively longer exposure time than a corresponding normal or "short" exposure image for the image capture device, e.g., an exposure time that is 4 to 30 times longer than a short image's exposure time. In still other embodiments, the particular exposure time (and/or system gain) of a long exposure image may be further based, at least in part, on ambient light levels around the image capture device(s), with brighter ambient conditions allowing for comparatively shorter long exposure image exposure times, and with darker ambient conditions allowing the use of comparatively longer long exposure image exposure times. In still other embodiments, the particular exposure time (and/or system gain) of a long exposure image may be further based, at least in part, on whether the image capture device is using an OIS system during the capture operation.

The noise level in a given image may be estimated based, at least in part, on the system's gain level (with larger gains leading to larger noise levels). Therefore, in order to have low noise, an image capture system may desire to use small gains. However, as discussed above, the brightness of an image may be determined by the product of exposure time and gain. So, in order to maintain the image brightness, low gains are often compensated for with large exposure times. However, longer exposure times may result in motion blur, e.g., if the camera doesn't have an OIS system and/or if there is significant camera shake during the long exposure image capture. Thus, for cameras that have an OIS system, exposure times could range up to the maximum threshold exposure time in low light environments, which would allow for the use of a small gain—and hence less noise. However, for cameras that do not have OIS systems, the use of very long exposure times will likely result in motion blurred images, which is often undesirable. Thus, as may now be understood, a long exposure image's exposure time may not always be the maximum threshold exposure time allowed by the image capture device.

According to some embodiments, an incoming image stream may comprise a particular sequence and/or particular pattern of exposures. For example, according to some embodiments, the sequence of incoming images may comprise: EV0, EV−, EV0, EV−, and so forth. In some embodiments described herein, the pairs of repeating captured exposures (e.g., the EV0/EV− repeating pairs in the example given immediately above) may be referred to herein as an "image frame pair" (IFP). The IFP, according to some embodiments, may comprise an image that is captured and read out from the image sensor consecutively, e.g., immediately following, the capture of the corresponding image from the pair, e.g., an EV0 image. In some embodiments, the IFP may specifically comprise an EV0 image and one of: an EV−1 image frame, an EV−2 image frame, or an EV−3 image frame, etc. EV− images will have a lower exposure time and thus be somewhat darker and have more noise than their EV0 counterpart images, but EV−images may do a better job of freezing motion and/or representing detail in the darker regions of images than their EV0 or EV+ counterpart images. In other embodiments, the images in an IFP may comprise images captured with any desired differing exposure settings. For example, the sequence of incoming images may comprise: EV0 and EV+ images; EV− and EV+ images; different levels of EV− images; or different levels of EV+ images, etc. As will be appreciated in view of the discussion below, one benefit of utilizing an IFP is that, owing to the consecutive/near-simultaneous nature of the captures, the amount of image capture device movement between the capture of the respective images in an IFP should be negligible, thus suggesting that differences between the values of corresponding pixels in the images of the IFP are indeed due to the differing exposure values of the images—and not misalignment or internal content changes in the captured scene between the captures.

In response to a received capture request, according to some embodiments, the image capture device may take one (or more) long exposure images. After the long exposure capture, the image capture device may return to a particular sequence of incoming image exposures, e.g., the aforementioned: EV0, EV−, EV0, EV− sequence of IFPs. The sequence of exposures may, e.g., continue in this fashion until a subsequent capture request is received, the camera(s) stop capturing images (e.g., when the user powers down the device or disables a camera application), and/or one when or more operating conditions may change. In still other embodiments, the image capture device may capture one or more additional EV0 images in response to the received capture request and then fuse the additional EV0 short exposure images (along with, optionally, one or more additional EV0 images captured prior to the received capture request, if so desired) into a synthetic long exposure image, which synthetic long image may then be treated as a single image for the purposes of the image fusion processes described herein. According to some embodiments, the images in the incoming image stream may be obtained as part of a preview operation of a device, or otherwise be obtained while the device's camera(s) are active, so that the camera may more quickly react to a user's capture request. Returning to the sequence of incoming images may ensure that the device's camera(s) are ready for the next capture request.

Figure 1:
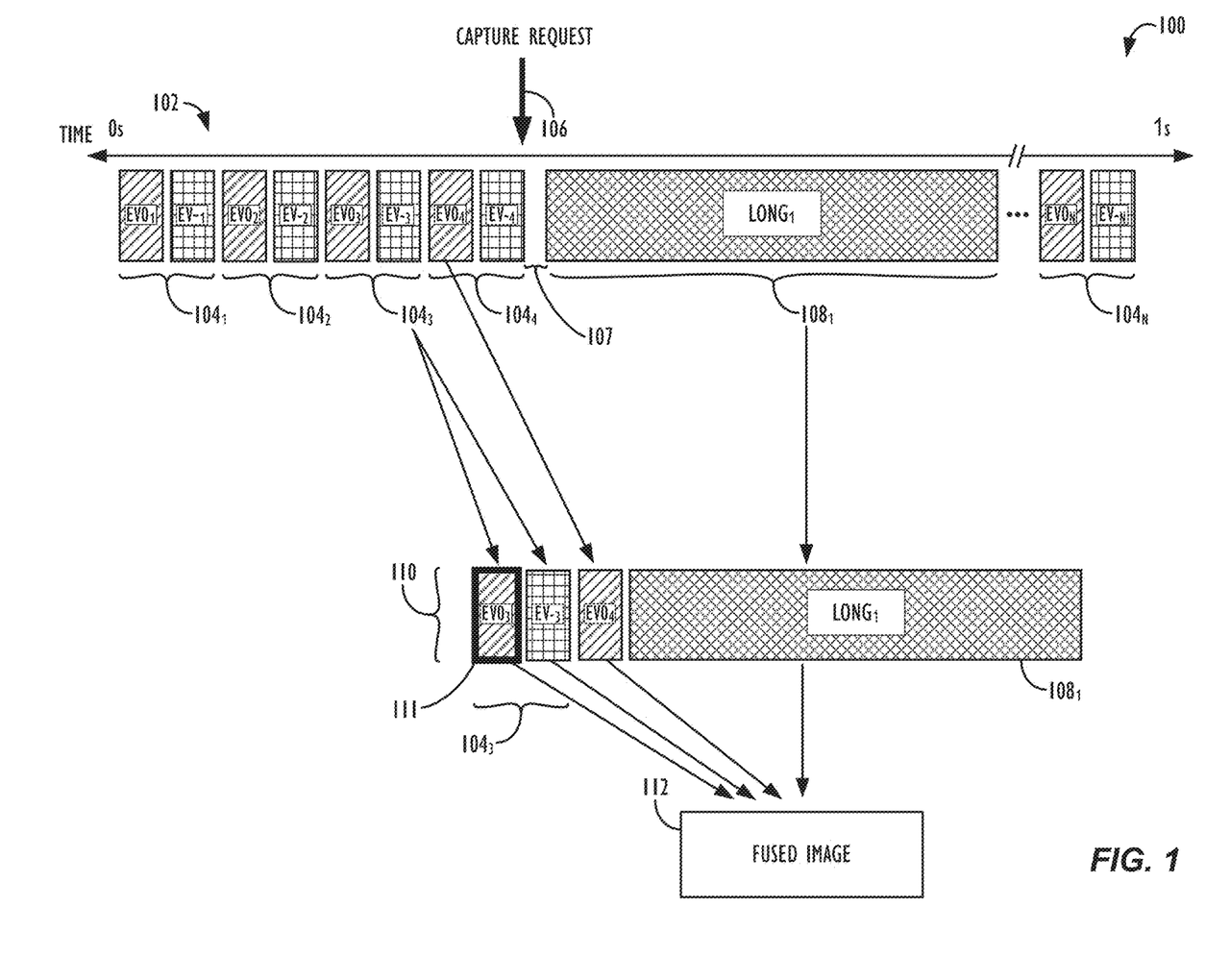
FIG. 1 illustrates an exemplary incoming image stream that may be used in an image gradient-based motion detection and method for selecting reference images, according to one or more embodiments.

Referring now to FIG. 1, an exemplary incoming image stream 100 that may be used in an image fusion method is shown in greater detail, according to one or more embodiments. Images from incoming image stream 100 may be captured along a timeline, e.g., exemplary image capture timeline 102, which runs from a starting point labeled 0 seconds, to a point labeled as 1 second. It is to be understood that this timeline is presented merely for illustrative purposes, and that a given incoming image stream could be captured for seconds, minutes, hours, days, etc., based on the capabilities and/or needs of a given implementation.

According to some embodiments, EV0 image frames in the incoming image stream may, by default, be captured according to a first frame rate, e.g., 15 frames per second (fps), 30 fps, 60 fps, etc. In some embodiments, this first frame rate may remain constant and uninterrupted, unless (or until) a capture request 106 is received at the image capture device. In other embodiments, the frame rate of capture of EV0 image frames may vary over time, based on, e.g., one or more device conditions, such as device operational mode, available processing resources, ambient lighting conditions, thermal conditions of the device, etc.

In the example shown in FIG. 1, various image frame pairs (IFPs) 104 are shown as being captured sequentially by the image capture device (e.g., $104_1$, $104_2$, $104_3$, $104_4$, and so forth), with each IFP including two images with differing exposure values, e.g., an EV0 image and a corresponding EV− image. Note that the EV0 and EV− images illustrated in FIG. 1 use a subscript notation (e.g., $EV_1$, $EV_2$, $EV_3$, $EV_4$, and so forth). This subscript is simply meant to denote different instances of images being captured (and not different numbers of exposure stops). It is to be understood that, although illustrated as pairs of EV0 and EV− images in the example of FIG. 1 (and as will be discussed in the particular context of pairs of EV0 and EV− images below with reference to FIG. 2), any desired pair of exposure levels could be utilized for the images in an IFP, e.g., an EV0 image and an EV−2 image, or an EV0 image and in EV−3 image, etc. In other embodiments, the IFP may even comprise more than two images (e.g., three or four images), based on the capabilities of the image capture device or image sensor hardware.

Moving forward along timeline 102 to the capture request 106, according to some embodiments, a long exposure image $108_1$ may be captured by the image capture device in response to the receipt of the capture request 106. According to some embodiments, an additional delay 107 may be built in to the image capture stream following the receipt of an capture request 106, e.g., so that any shaking or vibrations caused by a user's touching or selection of a capture button on the image capture device (e.g., either a physical button or software-based user interface button or other graphical element) may be diminished before the initiation of the long exposure image capture, which, although more likely to produce a low-noise image, is potentially more prone to blurring, and thus lack of sharpness, due to the amount of time the shutter stays open during the capture of the long exposure image.

Based on the evaluation of one or more capture conditions and/or implementation preferences, the image capture device may, in response to the receipt of a capture request, select two or more images 110 for inclusion in the image fusion operation. In the example of FIG. 1, the images: $EV0_3$, $EV−_3$, $EV0_4$, and $LONG_1$ have been selected for inclusion in the fusion operation, and, in particular, IFP $104_3$ has been selected from among candidate IFPs $104_1$-$104_4$ to serve as the selected candidate IFP, meaning that one of images $EV0_3$ or $EV−_3$ (from image frame pair $104_3$) may be selected to serve as the reference image for the resultant fused image, e.g., in accordance with the various methods described below with reference to FIG. 2. In the example illustrated in FIG. 1, image frame pair $104_3$ may have been selected as the candidate image frame pair from which the reference image will be selected due, e.g., to the fact that EV0$_3$ may be the sharpest EV0 image from among the candidate EV0 images being considered for the fusion operation (or whatever criteria the candidate image frame pair selection decision may be based on for a given implementation).

According to such embodiments, from the selected candidate image frame pair (e.g., comprising one EV0 image and one EV− image), the process may select one image to serve as the reference image 111, i.e., either the EV0 image or the EV− image from the selected candidate image frame pair, e.g., in accordance with the various methods described below with reference to FIG. 2. For example, in order to ensure lower noise, the EV0 image from the selected candidate image frame pair may be selected as the reference image, especially in lower ambient light level conditions. On the other hand, e.g., in dynamic scenes with moving objects and/or people, the EV− image may be selected to serve as the reference image because it ensures a shorter exposure time and hence less motion blurring than the corresponding EV0 image from the selected reference image frame pair.

In the example illustrated in FIG. 1, EV0$_3$ has been selected to serve as the reference image 111 for the fusion operation (as indicated by the thicker border line on EV0$_3$), e.g., in accordance with the various methods described below with reference to FIG. 2. Once a final reference image is selected, each of the other selected images 110, e.g., including EV−$_3$, EV0$_4$ and long exposure image 108$_1$ in the example illustrated in FIG. 1, may be selected as the candidate images for the fusion operation and registered with respect to the reference image 111 (i.e., registered with EV0$_3$, in this example).

A fusion operation involving the selected images 110 (e.g., the reference image and various candidate images) will result in fused image 112. The decision of which images to include in the fusion operation may be based on a set of predetermined rules and/or decision tree that may be used to translate various capture conditions (or other parameters) into the particular set of images that will be selected for the image fusion operation. The decisions regarding whether (or to what extent) each of the selected images 110 should influence each pixel position in the final fused image at 112 may be based on any desired fusion weighting scheme. Further, noise reduction operations may be applied to any of the constituent images used in the fusion operation before the fusion takes place and/or on the resultant fused image itself, e.g., in order to attempt to further increase the quality of the resultant fused image.

A Robust Image Gradient-Based Approach to Motion Detection

Figure 2:
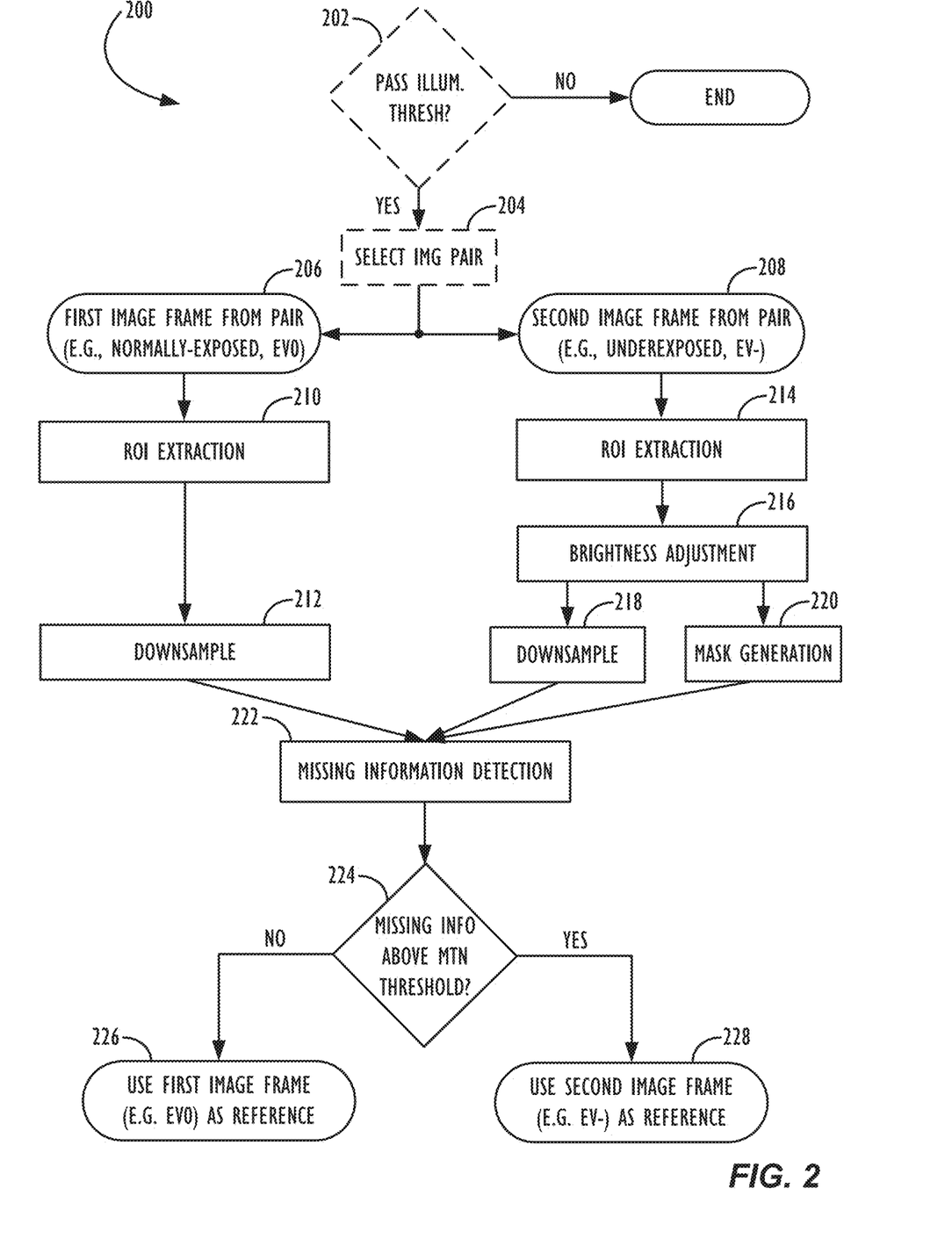
FIG. 2 is flow chart illustrating a method of robust, image gradient-based motion detection and reference image selection, according to one or more embodiments.

Referring now to FIG. 2, a flow chart 200 illustrating a method of robust, image gradient-based motion detection and reference image selection is shown, according to one or more embodiments. First, the process 200 may begin at Step 202 by analyzing the illumination conditions of the scene that is to be captured and deciding if the additional motion freezing that might be obtained from selecting an underexposed, e.g., EV−, image to serve as the reference image in a fusion operation would be beneficial to the overall quality of the resultant fused image. In the context of motion freezing, the tradeoff of selecting an underexposed image to serve as the reference image is that noise characteristics of captured images worsen with shortened exposure time, as the number of photons collected by the sensor is much less than in normally-exposed or overexposed images. Therefore, additional motion freezing via the selection of underexposed reference images may not be not universally desired in all situations. By analyzing the exposure time of image captures and the lux level estimation of the scene, undertaking the process of attempting to introduce additional motion freezing via the selection of underexposed reference images (as described in reference to the remainder of FIG. 2) may be avoided when the benefits don't justify the additional SNR loss.

Thus, according to some embodiments, the determination of whether or not to perform the robust motion detection analysis techniques described herein may be based on the evaluation of the following equation:

$$R(Lux, ET) = (Lux \leq \tau_{low}) \wedge (Lux \leq \tau_{high}) \wedge (ET \geq \tau_e) \qquad \text{(Eqn. 1)},$$

where R represents a Boolean function of the lux level estimation of the scene (Lux) and the exposure time (ET), which indicates whether or not robust motion detection shall be performed, $T_{low}$ and $T_{high}$ are lower and upper bounds of lux level, respectively, and the $T_e$ is the minimum exposure time required. As shown in Eqn. 1 above, the result evaluates to "TRUE" if all three of the individual conditions are found to be true. The thresholds may be designed to match natural capturing statistics for a given imaging system and may be evaluated on a representative dataset. If motion analysis is not required, i.e., if the Boolean expression of Eqn. 1 evaluates to "FALSE" (i.e., "NO" at Step 202), then the process 200 of FIG. 2 may end, and the image capture device may simply continue to use the EV0 image frame from the selected candidate image frame pair (or whatever other captured image is selected by default to serve as the reference image in a given implementation) as the reference image for the fusion operation (i.e., skipping the rest of the robust motion detection techniques described below with reference to process 200). If, instead, motion analysis is recommended, i.e., if the Boolean expression of Eqn. 1 evaluates to "TRUE" (i.e., "YES" at Step 202), then the process 200 of FIG. 2 may proceed to Step 204 to select a candidate image frame pair to which the robust motion detection analysis techniques described herein may be applied. [The dashed line around Step 202 in FIG. 2 indicates that the threshold illumination test of Step 202 is optional and that, in some implementations, the remainder of process 200 may simply be attempted in all illumination scenarios, without regard to consideration of the various lux level and exposure time thresholds described above.]

As alluded to above, in some instances, the reference image may be selected to come from one of a plurality of candidate image frame pairs, i.e., the pairs of repeating captured exposures (e.g., pairs of repeating EV0/EV− image captures) being captured by an image capture device prior to (and/or after) the image capture device receives a capture request from a user. For example, in some embodiments, the candidate image frame pairs may comprise some number, n, of the most recent image frame pairs captured prior to the capture request. In other embodiments, the candidate image frame pairs may comprise some number, s, of the sharpest (e.g., as measured by the sharpness of at least one of the images within a respective candidate image frame pair) image frame pairs out of the most recent n image frame pairs captured prior to the capture request. In still other embodiments, the candidate image frame pairs may comprise some number, c, of the image frame pairs captured closest in time to the sharpest image frame pair from among the most recent n images frame pairs captured prior to the capture request. By whatever method so desired for a given implementation, e.g., based on an evaluation of one or more desired criteria, the output of Step 204 will be the identification and selection of a particular candidate image frame pair that will be evaluated further to determine which image from the selected candidate image frame pair will be designated to serve as the reference image in a subsequent fusion operation, e.g., if a desired goal is to reduce an amount of motion distortion in the resultant fused image. [The dashed line around Step 204 in FIG. 2 indicates that the candidate image frame pair selection process of Step 204 is optional and that, in some implementations, process 200 may simply select a predetermined image frame pair with respect to each capture request, e.g., the image frame pair captured closest in time to the capture request, without consideration of various other candidate image frame pairs, as described above.]

In the example illustrated in FIG. 2, the selected image frame pair from Step 204 comprises a first image frame 206 having a first exposure level (e.g., a normally-exposed image, such as an EV0 image) and second image frame 208 having a second exposure level, e.g., an exposure level that is different than the first exposure level (e.g., an underexposed image, such as an EV− image). Images 206 and 208 from the selected candidate image frame pair may then be further processed via independent image processing pathways for robust motion detection analysis.

One role of the motion detection analysis techniques described herein is to estimate the amount of motion blur in the first image frame (e.g., EV0) 206 by comparing its spatial information with that of the comparatively underexposed second image frame (e.g., EV−) 208. Assuming that the underexposed second image frame 208 is free from motion (or at least has significantly less motion than its counterpart normally-exposed first image frame), the corresponding texture or edge details would be blurry in the normally-exposed first image frame in the motion area(s). Such comparison provides useful information to estimate the amount (and location) of motion in the scene, as will be described in greater detail with reference to FIG. 3A, below.

Next, Region of Interest (ROI) extraction operations 210 and 214 may be performed on the first image frame (206) and the second image frame (208), respectively. According to some embodiments, the ROI may comprise a collection of overlapping or non-overlapping portions, e.g., tiles, overlaying the images at particular locations. As will be described in greater detail below with reference to FIG. 3B, in other embodiments, the location and/or size of the ROI may be based, at least in part, on regions within the image where it is predicted that human viewers will pay the most attention to the image.

Next, at Step 216, the underexposed second image frame 208 may be scaled to the same (or a more similar) brightness level as the normally-exposed first image frame 206. According to some embodiments, the relative brightness may be estimated from the overall image gain applied by the image processing pipeline, as well as the exposure time. In other embodiments, the brightness level may be estimated by multiplying the exposure time by the overall gain. Thus, if, for example, there is determined to be a 2× difference in brightness level between the first and second image frames, the pixel signal values in the second image frame may be scaled up by a factor of 2, so as to be equivalent in brightness to equivalent pixels in the first image frame.

Next, at Step 220, a mask may be generated over the underexposed second image frame 208, wherein the mask may be used to define regions within the underexposed second image frame 208 that should be excluded (or at least given a reduced influence) in the motion detection analysis process 200, e.g., regions of clipped (or near-clipped) pixels in the second image frame 208, wherein the difference between the first and second image frames may be due to factors other than motion (e.g., physical limitations of the image sensor, as in the aforementioned clipped pixels scenario). For another example, flickering may occur during the capture of the images and introduce artifacts of different patterns to the image frame pairs. For yet another example, in scenes that are not well-illuminated, shadow regions within captured images may have quite different noise characteristics, e.g., when comparing between corresponding regions in a captured EV0 image frame and a captured EV− image frame. Including the most extreme low value pixels (e.g., pixels with a value of 5 or lower in an 8-bit image), which are likely to be dominated by noise effects unrelated to scene motion, in the mask of pixels that are to be excluded from the motion detection analysis process may further help improve the robustness of the motion detection analysis process. Thus, as may now be understood, such a mask may be generated to reduce interfering factors to the motion detection steps that will be applied later in method 200.

Next, downsampling operations 212 and 218 may be performed on the first image frame (206) and the second image frame (208), respectively. According to some embodiments, the selected image frames may be downscaled by a predetermined or tunable factor (e.g., a factor of 2, or 4, or 8) in order to attempt to reduce the SNR difference between the first image frame 206 and the second image frame 208. Once the first image frame 206 and the second image frame 208 have been prepared for comparison as so desired (e.g., in accordance with the various ROI extraction, brightness adjustment, mask generation, and downsampling methods described above), the method 200 may proceed to missing information detection Step 222 to obtain a robust estimate of the amount (and location) of motion within the captured images.

At missing information detection Step 222, a gradient map may be computed for each of the first image frame 206 and the second image frame 208, e.g., with edge detection kernels (using a Sobel filter, for example), and then the missing information in the gradient map of the first image frame 206 may be compared with respect to the gradient map of the second image frame 208. Examples of gradient maps and comparisons between the gradient maps of the two images from the selected image frame pair are shown and discussed in more detail below with reference to FIG. 3A.

In the case of consecutively-captured image frame pairs (as has been described herein) the time delay between the capture of the first image frame from the pair (e.g., EV0) and the second image frame from the pair (e.g., EV−) is minimal, and, thus, the difference in static regions of the scene between the two images should be negligible. Therefore, the amount of missing information in the normally-exposed first (e.g., EV0) image frame may be largely correlated to the motion of interest (especially if various potential interfering factors have already been filtered out of the comparison operation, e.g., with the mask generated in Step 220, above).

According to some embodiments, the missing information may be quantified according to the following equation:

$$MI_{map}^{t}(I_m, I_0) = \max(0, G(I_m) - G(I_0)) \cdot mask^t \quad (Eqn.\ 2),$$

where G is gradient detection procedure, $I_m$ and $I_0$ are the EV− and EV0 frames respectively, and $mask^t$ and $MI^{t}_{map}$ are the mask and the missing information map for a given ROI tile, t, respectively. [The construction of an ROI using various tiles overlaying the image is illustrated and explained in further detail below with reference to FIG. 3B.] In some such embodiments, the missing information detection process will locate regions where the gradient in the EV− image, i.e., $G(I_m)$, is greater than it is in the EV0 image, i.e., $G(I_o)$, thereby reflecting details present in the EV− image that are not present in the corresponding location in the EV0 image, hence the use of the term "missing information." Based on the use of the 'max' operator in Eqn. 2 above, situations in which the opposite is true, i.e. where there is information present in the EV0 image that is missing in the EV-image, the missing information term will be pushed to 0 by the max operation, thus indicating to the overall motion detection process that there is not expected to be any missing information due to motion in the respective tile.

The missing information may be further modulated based on a viewer's likely sensitivity to the natural motion in the image. In particular, the Human Visual System (HVS) has particular motion sensitivity characteristics that may or may not match the relative magnitudes of the Missing Information (MI) values calculated as described above (i.e., just because a large amount of MI was detected in a given tile, it may not be indicative of the type of motion that is very noticeable or objectionable to a human viewer of the image). Thus, by modulating the MI information with a chosen function, e.g., a user-defined power function, the system may attempt to have the magnitude of the MI value more accurately reflect the actual amount of motion perceived by a human viewer in a given tile of the image. In one example, the missing information score may be computed by modulating it with a power function, p, as follows:

$$MI^t(I_m, I_o) = \left( \frac{1}{N} \sum_{i=0}^{N} [MI^t_{map}(I_m, I_o)]^p \right)^{\frac{1}{p}}, \quad \text{(Eqn. 3)}$$

where $MI^t$ is the missing information score for tile t, and N is the total number of tiles.

The tile-based missing information scores may be compared to a threshold, $T_{motion}$, which may, e.g., be trained offline on a representative data set and can be based on various capture settings (e.g., gain and lux level) and/or high-level semantic scene classifications, according to the following equation:

$$EM^t = MI^t < T_{motion} \quad \text{(Eqn. 4)},$$

where $EM^t$ is a Boolean indicator of whether there is expected motion in a given tile, t.

The indications, $EM^t$, for each individual tile (or other image portion, e.g., if the ROI for a given image is divided into portions other than tiles) may then be aggregated into a single binary motion detection decision. In other words, if any $EM^t$ for any tile is found to be true (i.e., to exceed the determined motion threshold), then the expected motion (EM) for the entire image evaluates to "TRUE." (In other embodiments, it may be required that a certain number of the tiles are indicative or motion, or that a majority are indicative of motion, etc., for the image to be evaluated as exceeding the motion threshold.) An evaluation of the expected motion for the image being "TRUE," i.e., "YES" at Step 224, will result in the method proceeding to Step 228 and using the second image frame 208 (e.g., the underexposed EV− image) as the reference image for the fusion operation. If, instead, none of the $EM^t$ for any tile is found to be true, i.e., to exceed the determined motion threshold (or whatever other motion criteria is desired for a given implementation is not met or exceeded), then the expected motion (EM) for the entire image evaluates to "FALSE." An evaluation of the expected motion for the image being "FALSE," i.e., "NO" at Step 224, will result in the method proceeding to Step 226 and using the first image frame 206 (e.g., the normally-exposed EV0 image) as the reference image for the fusion operation.

Exemplary Image Edge Gradient Maps

Figure 3A:
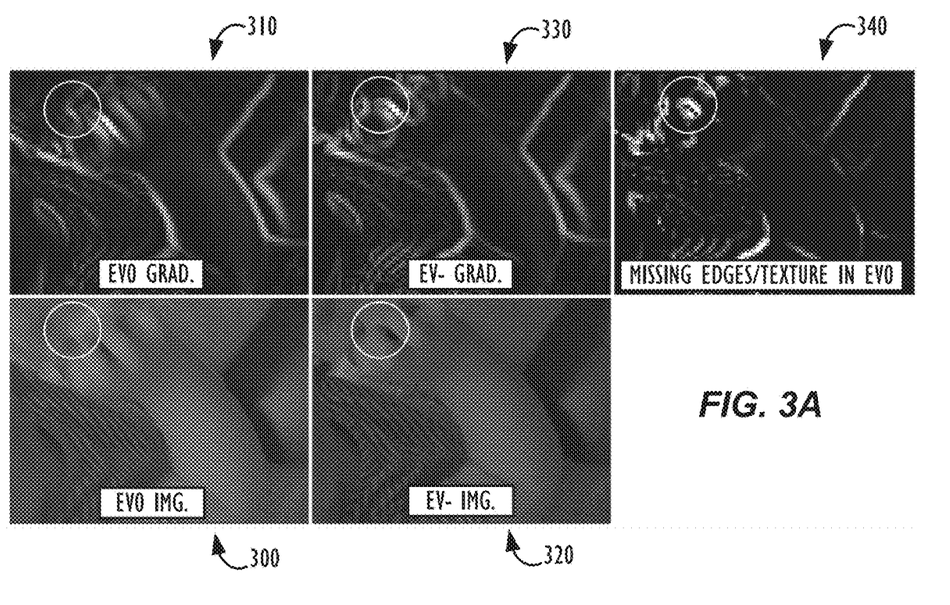
FIG. 3A illustrates exemplary images and gradient maps, according to one or more embodiments.
Figure 3B:
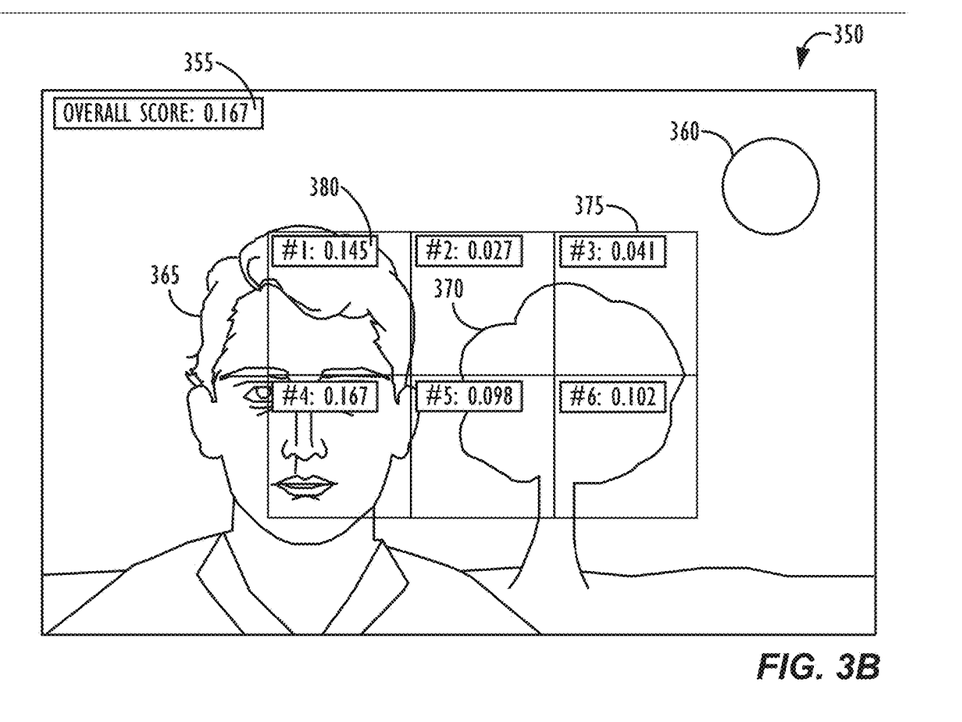
FIG. 3B illustrates exemplary Region of Interest (ROI) tiles overlaying a captured image, according to one or more embodiments.

FIG. 3A illustrates exemplary images and gradient maps, according to one or more embodiments. For example, EV0 image (300) and EV− image (320) may comprise two images from an aforementioned image frame pair (IFP). In the example of FIG. 3A, an analysis may be being performed in order to decide whether EV0 image (300) or EV− image (320) should serve as the reference image for a fusion operation, e.g., in accordance with the various methods described above with reference to FIG. 2. The circled region in EV0 image (300) and EV− image (320) indicates a region of motion within the captured image. In particular, it may be seen that there appears to be more motion blurring inside the circled region in the EV0 image (300), whereas the pixels in the circled region of the EV− image (320) appear sharper. This distinction is also reflected in the corresponding exemplary gradient maps, i.e., EV0 gradient map (310) and EV− gradient map (330). In particular, it may be seen that, within the corresponding circled region, the EV− gradient map (330) shows larger values (i.e., brighter pixels) than does the corresponding region in the EV0 gradient map (310). This is indicative of the sharper edges present in the circled region in the EV− image (320). Finally, gradient map (340) represents the difference between the exemplary gradient maps 310 and 330, i.e., the "missing" edges and textures in the EV0 image (300), e.g., as calculated in accordance with Eqn. 2 above. As discussed above, with reference to FIG. 2, the amount of missing edges and textures in the EV0 image may be used to serve as an indicator of the presence (and amount) of motion in a particular scene (or region of a scene). For example, if more than a threshold amount of motion is detected in the missing information, the more underexposed image from an image frame pair may be selected to serve as the reference image for a fusion operation (as opposed to the normally-exposed image from the image frame pair).

Exemplary Region of Interest (ROI)

FIG. 3B illustrates exemplary Region of Interest (ROI) tiles 375 overlaying a captured image 350, according to one or more embodiments. In this example, captured image 350 (which may comprise, e.g., an EV0 image from a given IFP) comprises various elements, e.g., the Sun 360, a human subject 365, and a tree 370. In this particular example, the ROI is comprised of a 3×2 grid of contiguous and non-overlapping tiles 375 overlaying a central portion of the captured image 350, which ROI covers portions of human subject 365, and tree 370, but excludes the Sun 360. Although, as described above, the ROI need not necessarily be placed at a predetermined location (or with a predetermined size) within the captured image and may instead be determined based on one or more of the following factors: an orientation of the image capture device during capture (e.g., placing ROI tiles in one layout for portrait orientation images and in a different layout for landscape orientation images); a portion of the capture image to which the image capture device's Auto Focus (AF) and/or Auto Exposure (AE) mechanisms have been directed (e.g., if a user has tapped on a particular region within the captured image to set the image capture device's focus and/or exposure parameters based upon the values of the pixels within the particular region); an explicit selection from a user (e.g., via a tap, touch, hold, or slide gesture, etc.); and/or high-level content analysis (e.g., output from face detection, neural networks, scene classification, object recognition, scene segmentation, and/or saliency networks, etc.). As one example of basing the ROI's position within the image on more than one of the factors enumerated above, according to some embodiments, ROI tiles may be placed over both the location of a detected face within an image and a region where a user has indicated that the image capture device's AF mechanism should be directed. In such a scenario, the various tiles/portions making up the overall ROI of the image need not be entirely non-overlapping or contiguous within the image.

As discussed above, with reference to Step 222 of FIG. 2, for each ROI tile, a missing information score value 380 may be computed. In some embodiments, an overall score value 355 for motion within the image may also be computed. In some cases, overall score value 355 may simply be set equal to the highest individual ROI tile score value 380. In other cases, the overall score value 355 may be set equal to an average, weighted average, median, mode, etc., of the individual ROI tile score values 380. As discussed above, with reference to Step 224 of FIG. 2, if the overall score value 355 (or one or more individual ROI tile score values 380, depending on implementation) exceeds a motion threshold amount, then the underexposed, e.g., EV−, image from the selected candidate image frame pair may be designated to serve as the reference image for the fusion operation, i.e., rather than the normally-exposed, e.g., EV0, image.

Exemplary Electronic Device

Figure 4:
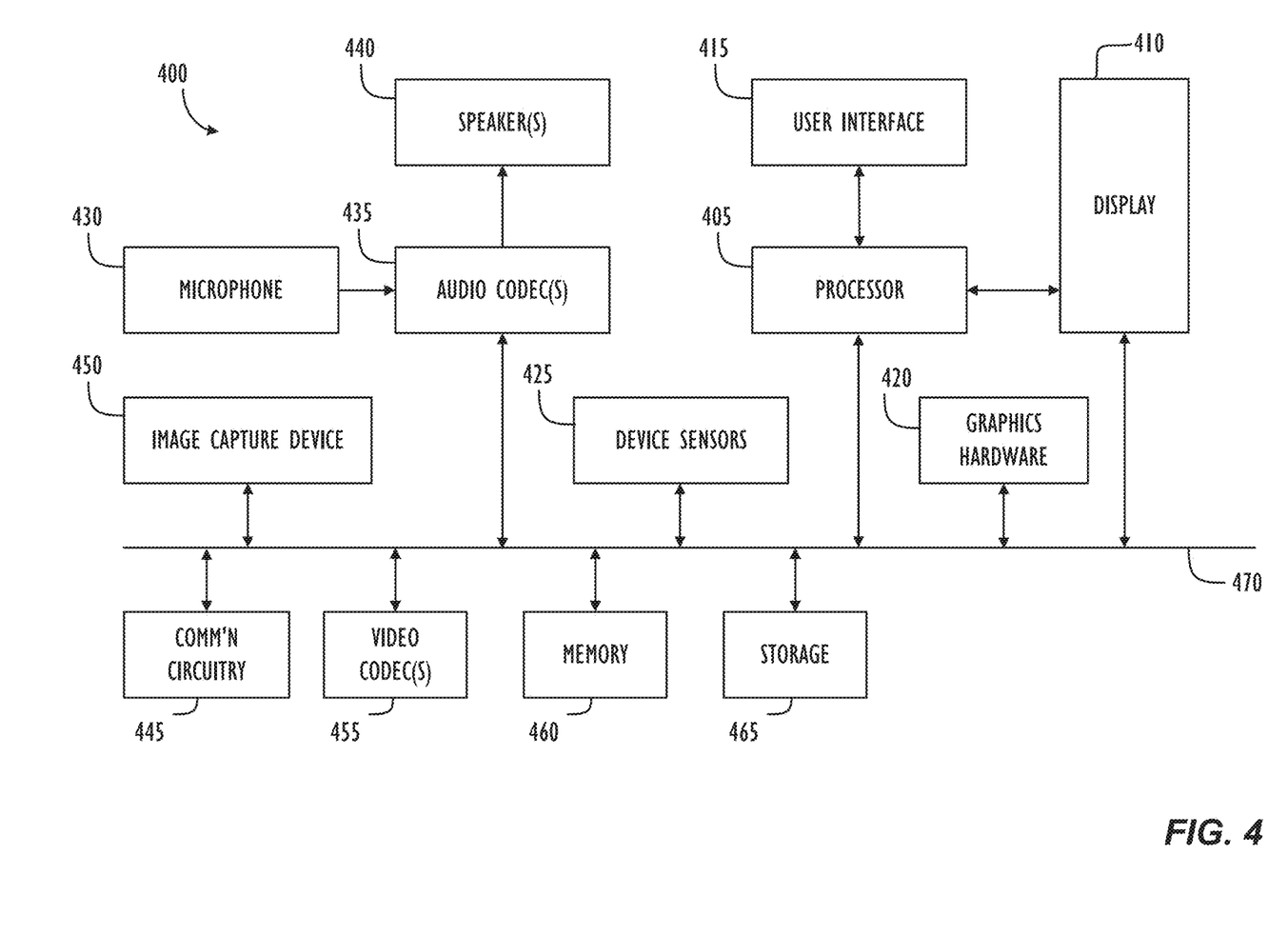
FIG. 4 is a block diagram illustrating a programmable electronic computing device, in which one or more of the techniques disclosed herein may be implemented.

Referring now to FIG. 4, a simplified functional block diagram of illustrative programmable electronic device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., HDR, OIS systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture device 450 may comprise one or more camera units configured to capture images, e.g., images which may be processed to generate fused and/or noise-reduced versions of said captured images, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices;
   a display;
   a user interface; and
   one or more processors operatively coupled to the memory, wherein the one or more processors are configured to execute instructions causing the one or more processors to:
   obtain an incoming image stream from the one or more image capture devices;
   select two or more images from the incoming image stream, wherein the selected two or more images comprise at least one image frame pair (IFP), wherein the IFP comprises a first image frame and a second image frame that were captured consecutively and with differing exposure settings;
   determine one of the first image frame or the second image frame to be designated as a reference image, wherein the determination is based, at least in part, on a comparison of an amount of motion in the first image frame to an amount of motion in the second image frame;
determine one or more of the selected two or more images not designated as a reference image to be designated as candidate images;
register the one or more candidate images with the reference image;
fuse the registered one or more candidate images and the reference image, resulting in a fused image; and
store the fused image in the memory.

2. The device of claim 1, wherein the second image frame comprises an image that is underexposed relative to the first image frame.

3. The device of claim 1, wherein the first image frame comprises an EV0 image.

4. The device of claim 2, wherein the second image frame comprises an EV− image.

5. The device of claim 1, wherein the incoming image stream comprises a plurality of IFPs, and wherein the instructions to select two or more images comprising the at least one IFP further comprise instructions to select the at least one IFP from among the plurality of IFPs based on an evaluation of at least one criteria.

6. The device of claim 1, wherein the comparison of an amount of motion in the first image frame to an amount of motion in the second image frame further comprises a comparison of an amount of motion within a Region of Interest (ROI) in the first image frame and second image frame.

7. The device of claim 6, wherein the comparison of an amount of motion in the first image frame to an amount of motion in the second image frame further comprises masking out at least a portion of the ROI from the comparison.

8. The device of claim 6, wherein the ROI comprises a plurality of non-overlapping image portions overlaying the first image frame and second image frame.

9. The device of claim 8, wherein the plurality of non-overlapping image portions are non-contiguous.

10. The device of claim 6, wherein a location or size of the ROI is based, at least in part on one or more of the following: an orientation of the image capture device during capture of the first image frame or second image frame; a portion of the first image frame or second image frame to which the image capture device's Auto Focus (AF) and/or Auto Exposure (AE) mechanisms have been directed; user input; and high-level content analysis of the first image frame or second image frame.

11. The device of claim 2, wherein the comparison of an amount of motion in the first image frame to an amount of motion in the second image frame further comprises:
computing a first gradient map over at least a portion of the first image frame;
computing a second gradient map over a portion of the second image frame corresponding to the at least a portion of the first image frame; and
comparing the first gradient map to the second gradient map to determine an amount of difference.

12. The device of claim 11, wherein the instructions to determine one of the first image frame or the second image frame to be designated as a reference image further comprise instructions to:
determine the first image frame to be designated as the reference image if the determined amount of difference does not exceed a motion threshold; and
determine the second image frame to be designated as the reference image if the determined amount of difference exceeds the motion threshold.

13. A non-transitory program storage device comprising instructions stored thereon to cause one or more processors to:
obtain an incoming image stream from one or more image capture devices;
select two or more images from the incoming image stream, wherein the selected two or more images comprise at least one image frame pair (IFP), wherein the IFP comprises a first image frame and a second image frame that were captured consecutively and with differing exposure settings;
determine one of the first image frame or the second image frame to be designated as a reference image, wherein the determination is based, at least in part, on a comparison of an amount of motion in the first image frame to an amount of motion in the second image frame;
determine one or more of the selected two or more images not designated as a reference image to be designated as candidate images;
register the one or more candidate images with the reference image;
fuse the registered one or more candidate images and the reference image, resulting in a fused image; and
store the fused image in a memory.

14. The non-transitory program storage device of claim 13, wherein the second image frame comprises an image that is underexposed relative to the first image frame.

15. The non-transitory program storage of claim 14, wherein the comparison of an amount of motion in the first image frame to an amount of motion in the second image frame further comprises:
computing a first gradient map over at least a portion of the first image frame;
computing a second gradient map over a portion of the second image frame corresponding to the at least a portion of the first image frame; and
comparing the first gradient map to the second gradient map to determine an amount of difference.

16. The non-transitory program storage device of claim 15, wherein the instructions to determine one of the first image frame or the second image frame to be designated as a reference image further comprise instructions to:
determine the first image frame to be designated as the reference image if the determined amount of difference does not exceed a motion threshold; and
determine the second image frame to be designated as the reference image if the determined amount of difference exceeds the motion threshold.

17. An image processing method, comprising:
obtaining an incoming image stream from one or more image capture devices;
selecting two or more images from the incoming image stream, wherein the selected two or more images comprise at least one image frame pair (IFP), wherein the IFP comprises a first image frame and a second image frame that were captured consecutively and with differing exposure settings;
determining one of the first image frame or the second image frame to be designated as a reference image, wherein the determination is based, at least in part, on a comparison of an amount of motion in the first image frame to an amount of motion in the second image frame;

determining one or more of the selected two or more images not designated as a reference image to be designated as candidate images;

registering the one or more candidate images with the reference image;

fusing the registered one or more candidate images and the reference image, resulting in a fused image; and storing the fused image in a memory.

18. The method of claim 17, wherein the second image frame comprises an image that is underexposed relative to the first image frame.

19. The method of claim 18, wherein comparing an amount of motion in the first image frame to an amount of motion in the second image frame further comprises:

computing a first gradient map over at least a portion of the first image frame;

computing a second gradient map over a portion of the second image frame corresponding to the at least a portion of the first image frame; and comparing the first gradient map to the second gradient map to determine an amount of difference.

20. The method of claim 19, wherein determining one of the first image frame or the second image frame to be designated as a reference image further comprises:

determining the first image frame to be designated as the reference image if the determined amount of difference does not exceed a motion threshold; and determining the second image frame to be designated as the reference image if the determined amount of difference exceeds the motion threshold.

\* \* \* \* \*